United States Patent [19]
May et al.

[11] 3,921,742
[45] Nov. 25, 1975

[54] VEHICLE, ESPECIALLY MOTOR VEHICLE FOR AGRICULTURAL PURPOSES

[75] Inventors: Oswald May, Bonn; Arno Gego, Aachen, both of Germany

[73] Assignee: Klockner-Humbolt-Deutz Aktiengesellschaft, Cologne, Germany

[22] Filed: Aug. 9, 1971

[21] Appl. No.: 170,188

[30] Foreign Application Priority Data
Aug. 10, 1970 Germany.......................... 20396672

[52] U.S. Cl.................... 180/50; 180/1 F; 180/45; 180/53 FE; 180/64 R; 180/70 R; 280/110
[51] Int. Cl............................................. B60k 17/30
[58] Field of Search............ 180/64 R, 54 R, 44, 45, 180/58, 70 R, 49, 50

[56] References Cited
UNITED STATES PATENTS

| | | |
|---|---|---|
| 1,112,678 | 10/1914 | Cowles................................ 180/58 |
| 1,410,921 | 3/1922 | Johnson............................... 180/44 |
| 2,692,778 | 10/1954 | Stump............................. 280/112 R |
| 2,941,611 | 6/1960 | Norrie................................. 180/45 |
| 3,331,464 | 7/1967 | VanDoorne................... 180/70 R X |
| 3,613,816 | 10/1971 | Gutbrod.............................. 180/54 |
| 3,614,989 | 10/1971 | Bott et al. ......................... 180/70 R |
| 3,685,853 | 8/1972 | Goldsmith.................. 280/112 R X |

*Primary Examiner*—David Schonberg
*Assistant Examiner*—John P. Silverstrim
*Attorney, Agent, or Firm*—Walter Becker

[57] ABSTRACT

A vehicle, especially for agricultural purposes. The vehicle has a frame with front and rear driven axles having wheels of equal size. A driving engine is mounted in the frame between the axles and extends transversely to the frame and drives the axles through a torque converter and a power dividing transmission located at one end of the engine. The axles are located above the centers of rotation of the wheels and the lower extremities of the axle differentials and of the engine and converter and transmission are located substantially in the same horizontal plane.

7 Claims, 3 Drawing Figures

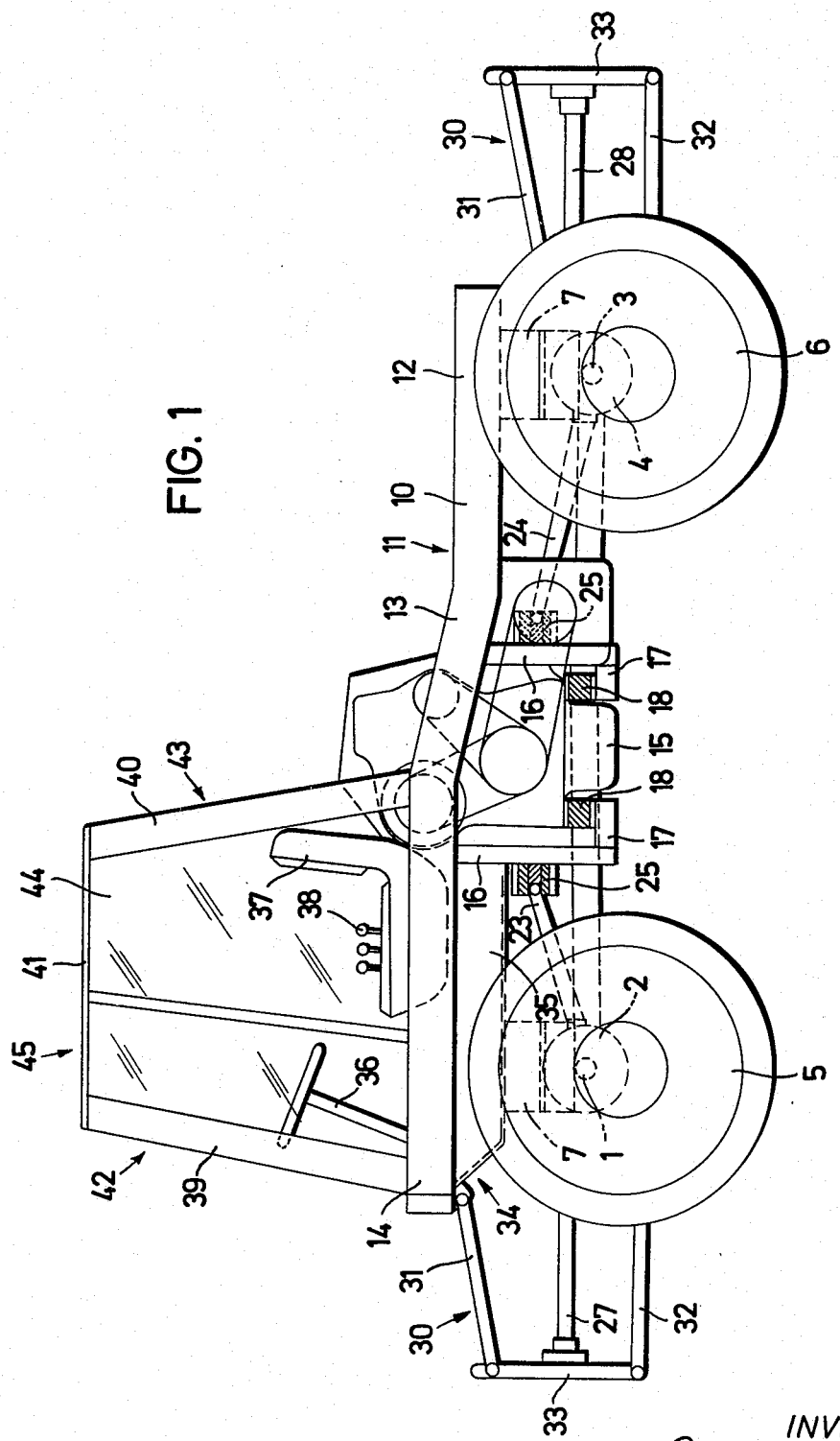

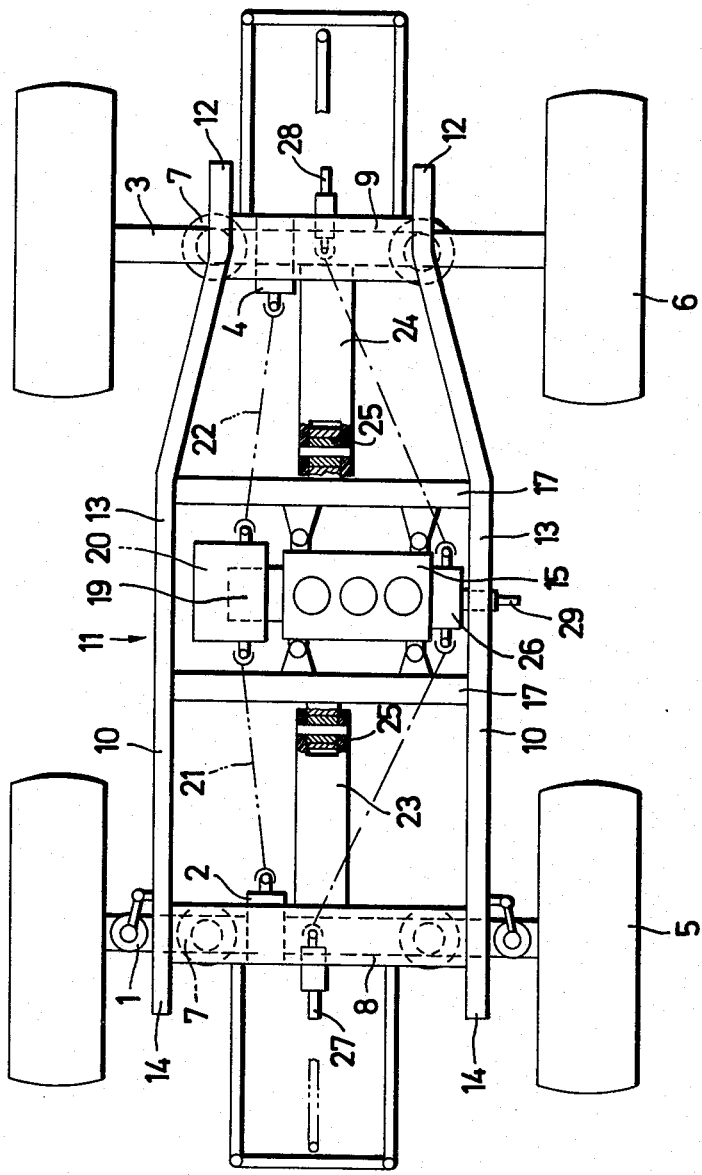

U.S. Patent   Nov. 25, 1975   Sheet 3 of 3   3,921,742
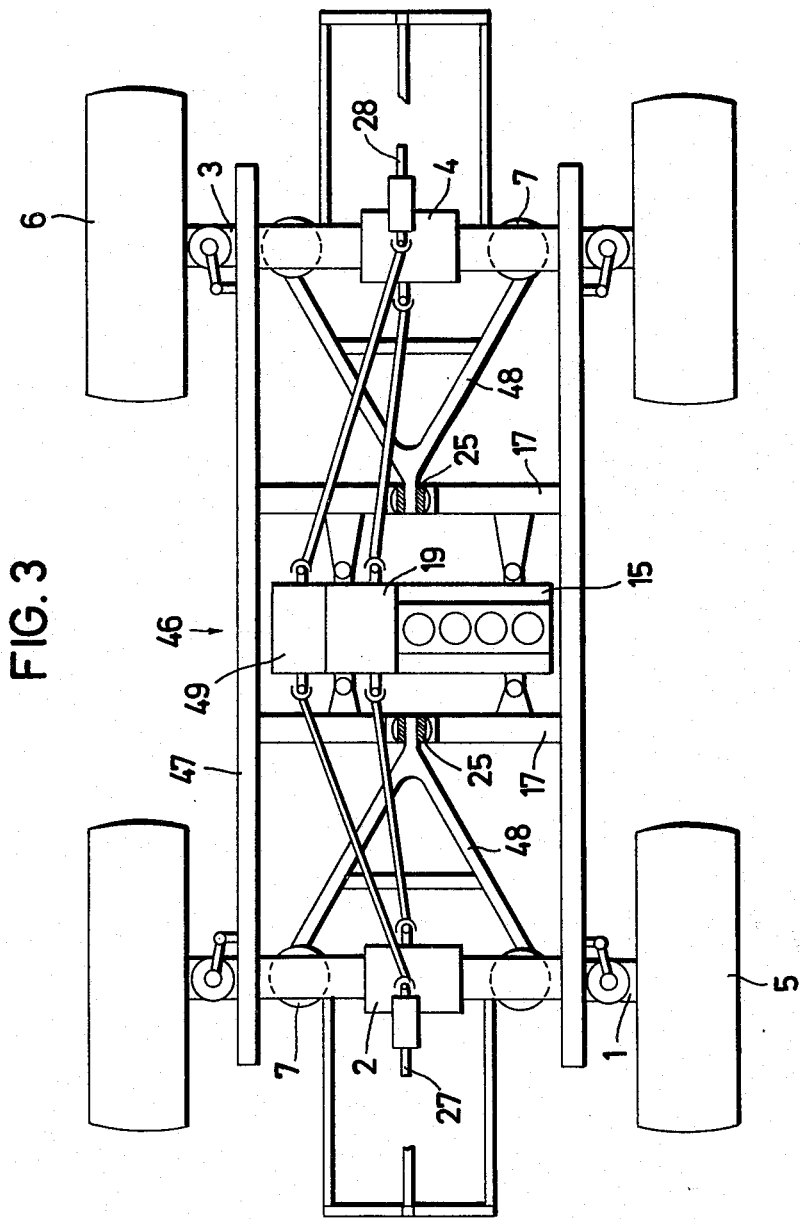

VEHICLE, ESPECIALLY MOTOR VEHICLE FOR AGRICULTURAL PURPOSES

The present invention relates to a vehicle, especially an agricultural motor vehicle for pulling, pushing and/or carrying implements, with two driving axles resiliently arranged on the vehicle frame and equipped with driving wheels of the same size, the drive for the driving wheels being supplied by a multi-cylinder internal combustion engine through the intervention of a torque converter and a power division.

In agriculture there exists the problem by means of a motor vehicle to be able economically to work large areas by means of implements mounted on the rear and front end of the vehicle, and also to be able by means of the same vehicle to carry out transporting and loading operations in a manner which is economical and requires the minimum effort on the part of the driver.

As solution to this problem, a motor vehicle has been suggested according to which the internal combustion engine has its longitudinal central axis arranged parallel to and laterally offset with regard to the longitudinal central axis of the vehicle and is mounted partly within the region of the vertical extension of the front driving wheels. That end of the internal combustion engine which faces toward the rear driving axle has flanged thereto a torque converter which is designed as a mechanical change gear transmission and which is followed by a distributing transmission forming the power division, the drive of the take-off shafts of the vehicle on all sides thereof being effected from the change gear transmission. In view of this construction, an axle load distribution of approximately ⅔ is obtained for the front driving axle which is adapted to be steered, and approximately ⅓ for the rear driving axle. Such vehicle, however, is not suitable for the desired connection of working implements without a supporting wheel regardless of whether the driving power for the vehicle is low or high. This is due to the fact that, in view of the uneven axle load, especially the masses of a working implement located at the front of the vehicle and acting upon the front driving axle center with a large lever arm will bring about that a vehicle having its center of gravity located relatively high will carry out pitching or nose diving movements about an axis which extends transverse to the longitudinal central axis of the vehicle. As a result thereof, the steering stability and the transmission of the driving power to the driving wheels are interfered with to an inadmissible extent.

Furthermore, this heretofore known vehicle has the drawback that its driving stability on a slope is insufficient in view of the relatively high overall center of gravity. Furthermore, this heretofore known motor vehicle is not suitable for driving heavy front and/or rear loaders in view of the spring strokes and the uneven axle loads of such vehicle.

It is, therefore, an object of the present invention to provide a motor vehicle of the above mentioned general character which will overcome the above referred to drawbacks.

It is another object of this invention to provide a vehicle as set forth in the preceding paragraph, which while affording good visibility and high steering and driving stability, will make it possible to carry out a working of the soil by means of working implements at the front and/or rear without contact wheel, and will also be able to carry out heavy transporting and loading operations.

These and other objects and advantages of the invention will appear more clearly from the following specification in connection with the accompanying drawing, in which:

FIG. 1 is a side view of a motor vehicle according to the present invention.

FIG. 2 is a top view of the vehicle of FIG. 1 and shows the driving mechanism as well as the driving diagram of the motor vehicle.

FIG. 3 shows a modified driving system and driving diagram according to the present invention.

The vehicle according to the present invention is characterized primarily in that the internal combustion engine with its longitudinal central axis extending transverse to the longitudinal central axis of the vehicle, at least with the primary part of the torque converter arranged adjacent to or in series, is located between the driving axles in such a way that the common center of gravity of the internal combustion engine and the primary part of the torque converter is located below the vehicle frame, approximately centrally between the driving axles, and that the driving axles are connected to the vehicle frame through the intervention of rubber springs.

Due to this construction it will be assured that when employing the soil working implements without a supporting wheel, even under unfavorable load conditions an almost sli-free power transmission of the driving wheels will be possible while a high steering stability will be assured. In addition thereto, the motor vehicle according to the invention furnishes the advantageous possibility of being able to carry out heavy loading operations with a front and/or rear loader in steeper slope positions than was possible heretofore. Furthermore the vehicle according to the present invention affords the possibility to provide a driver's platform with or without a cab on the vehicle while sufficient space is left for connecting the trailing implement. At the same time the construction of the vehicle according to the invention greatly improves the visibility for the driver as well as for a rider.

According to a further development of the invention, in order to have a satisfactory ground clearance for the vehicle, it is provided that the driving axles are designed as portal axles and that the lower edges of the portals and the lower edges of the internal combustion engine, of the torque converter, and of the power branch are limited or defined by a substantially common horizontal plane.

A simple and relatively inexpensive guiding of the driving axles can be realized by using the rubber springs as transverse guiding elements for the driving axles and by guiding the axles on the vehicle by means of central longitudinal links or arms through the intervention of a spherical joint. A longitudinally stiff axle guiding is obtained by designing the longitudinal arms as triangular arms.

According to a further feature of the invention it is provided that the internal combustion engine is preferably elastically mounted on transverse traverses which are arranged on both sides of the internal combustion engine below the vehicle frame and are connected to the latter by bending-resistant hinged tie bars. The structural elements may perform a dual purpose when employing the transverse traverses as holding means for the spherical bearings of the longitudinal links or arms.

Furthermore, for connecting the working implements as close to the center of gravity of the vehicle as possible and in order to provide good visibility with regard to the driving wheels and the working implements, it is provided that the driving wheels of at least one driving axle protrude beyond the front and rear edge respectively of the vehicle frame.

According to a still further development of the invention it is provided that between the front end face edge of the vehicle and the internal combustion engine there is arranged a driver's platform with steering device, driver'seat and a seat for a rider as well as actuating means for the vehicle drive and the implements. In this connection, in order to lower the position of the overall center of gravity of the vehicle, it is advantageous to have the driver's platform located between the side walls of the vehicle frame so as to extend into the region of the vertical extension of the driving wheels. It is furthermore expedient that the driver's platform forms a trough or pan. A further dual purpose of the structural elements can be realized by designing the trough or pan as a transverse traverse interconnecting the side walls of the vehicle frame.

In conformity with the present invention it is furthermore suggested that the side walls of the vehicle frame within the region of the driver's platform extend above the vertical extension of the front driving wheels and on that end which faces away from the platform are located within the region of the vertical extension of the rear driving wheels. In this connection it is advantageous to have a side wall of the vehicle frame vertically angled off in the region of the internal combustion engine. Moreover, it is also suggested according to the invention that the side walls of the vehicle frame are within the region of the rear driving wheels and/or within the region of the internal combustion engine angled off horizontally. Provided that with the vehicle according to the invention there are respectively arranged power take-off shafts at the front and at the rear and/or on both sides of the vehicle, it is possible according to the invention to effect the drive of the power take-off shaft or shafts from that end face of the internal combustion engine which faces away from the torque converter. Instead of this arrangement, is is also possible to drive the power take-off shaft or shafts through the intervention of a branch-off transmission located between the internal combustion engine and the torque converter or following the torque converter.

For purposes of protecting the driver and his rider against injuries, it is furthermore provided that on that side which is remote from the driver's seat and within the range of the driver's platform there are respectively arranged protective yokes in case the vehicle is tipping over. Such protective devices may be of substantially U-shape and may be in a bending-resistant manner connected to the side walls of the vehicle frame. A vibration-free construction is obtained by connecting the protective yokes through elastic intermediate members to the vehicle frame. These protective yokes may also be employed for holding windows and windshields at the ends and/or the sides of the vehicle. The protective yokes may be bridged by a preferably stiff roof portion for forming a driver's cab. For purposes of assuring good visibility, with regard to any attached implements and with regard to the driving wheels of the vehicle, it is advantageous to design the driver's cab in the form of a truncated pyramid.

Referring now to the drawings in detail, the motor vehicle illustrated in FIGS. 1 and 2 has a front steerable driving axle 1 with an axle differential 2 and also has a rear driving axle 3 which, according to the specific illustration, is designed as a rigid axle and is equipped with an axle differential 4. The two driving axles 1 and 3 are intended for driving the front and rear driving wheels 5 and 6 respectively and for purposes of obtaining a high ground clearance for the vehicle are preferably designed as a portal structure. Furthermore, the driving axles 1 and 3 are by two preferably block-shaped rubber springs with a short spring stroke guided on a front and rear transverse traverse 7, 8 respectively. The block-shaped rubber springs 7 are arranged on both sides of the axle differentials 2, 4 and are firmly connected thereto. The spring stroke of the rubber springs 7 may be linear or progressive. The transverse traverses 8 and 9 together with lateral walls 10 arranged parallel to each other to form a vehicle frame 11. As will be seen from FIG. 2, the longitudinal walls 10 have their parallel rear portions 12 which are located within the region of the rear driving wheels 6 arranged relative to each other at a smaller transverse distance than the front portions 13 and 14. The merging area where the central portions 13 merge with the rear portions 12 is formed by angled-off section of the walls 10 in a horizontal plane. The rear portions 13 of the vehicle frame 10 serve for receiving trailing implements not shown, for instance, a spray container, a rear loader, or the like.

Approximately centrally between the two driving axles 1 and 3 and, more specifically, between the two longitudinal walls 10, there is provided a multi-cylinder internal combustion engine 15 for driving the vehicle, the longitudinal central axis of the engine 15 extending in a direction transverse to the longitudinal central axis of the vehicle. The internal combustion engine 15 rests on transverse traverses 17 which are located on both sides of the engine below the vehicle frame 11 and connected to the longitudinal walls 10 of the frame 11 by bend-resistant hinged tie bars 16. Preferably, between the traverses 17 and the internal combustion engine 15 there are provided elastic intermediate members 18. The arrangement of the traverses 17 and the bars 16 is, in conformity with the invention, so selected that the lower edge of the internal combustion engine 15 and the lower edges of the axle differentials 2, 4 are in downward direction delimited by a common horizontal plane so that the center of gravity of the internal combustion engine is located approximately centrally between the driving axles 1 and 3 below the vehicle frame 11.

As will be seen from FIG. 2, the internal combustion engine 15 is coupled to a torque converter 19 designed, for instance, as change gear transmission and is coupled to the torque converter 19 by means of a branch-off transmission 20 not shown in detail. The branch-off transmission 20 is through a joint shaft 21 coupled to the axle differential 2 of the front driving axle 1 and through a joint shaft 22 to the axle differential 4 of the rear driving axle 3. The transmission 20 may be provided with a blockable non-illustrated differential element. The front driving axle 1 is located directly behind the driving axle 3 and by means of an axle-connected intermediate arm 23, 24 with a spherical bearing 25 at the end thereof is guided on special transverse traverses of the hinged tie bars 16 or on the transverse traverses 17 in the longitudinal direction of the vehicle. The motor speed dependent drive of a front take-off shaft 27 or a rear take-off shaft 28 for front and rear working implements respectively (not shown) is effected by the driving engine 15 parallel to the drive of the driving wheels 5, 6 through a branch-off transmission 26 not shown in detail in the drawing. The transmission 26 is arranged on that end face of the engine 15 which faces away from the torque converter 19 and is provided with shiftable clutches. In addition thereto, the branch-off transmission 26 has a lateral take-off shaft 29. The working implements are adapted to be linked to the vehicle on the front and rear side means of an implement connecting device 30 on the vehicle frame 11 or the driving axles 1 and 3 as shown in FIG. 2. The two implement connecting devices 30 comprise an upper member 31 connected to the vehicle frame 11, two lower members 32 pivotally connected to the driving axles 1, 3, and furthermore comprises a fast coupling frame 33. Both implement connecting devices 30 are by means of a non-illustrated hydraulic power lift or a corresponding lifting or pulling cylinder adapted to be lowered or lifted. The lifting or pulling cyliders are supplied with a working fluid from a non-illustrated pump driven by the engine 15.

Between the front end face of the frame 11 and the internal combustion engine 15 there is provided a driver's platform 34 with a trough-shaped portion 35 which is partially located in the region of the vertical extension of the front driving wheels 5. The driver's platform 34 has a steering device 36, a driver's seat 37 and operating means 38 for controlling the drive of the vehicle and for controlling implements connected to the vehicle. Moreover, the driver's platform 34 adjacent to the driver's seat 37 is provided with a rider's seat, preferably adjacent to the driver's seat. The trough-shaped portion 35 preferably forms a transverse traverse for the longitudinal walls 10 of the vehicle frame 11.

In order to protect the driver in case the vehicle tips over, the vehicle has that end face which is in front of the steering device 36 equipped with bend-resistant protective yokes 39 and 40 which are connected directly to the longitudinal walls or through the intervention of elastic intermediate members, the yokes 39, 40 having a substantially U-shaped contour. The two yokes 39, 40 are bridged by a roof portion 41 which is stiff or rigid in the longitudinal direction of the vehicle and is provided with front, rear and lateral windshields or window panes 42, 43, 44 which together with the yokes 39, 40 form a driver'cab 45. The yokes 39 and 40, the roof portion 41 and the window panes 42–44 should, for purposes of creating favorable visibility conditions as to the working implements connected to the vehicle and as to the driving wheels 5, 6, be so designed that the driver's cab 44 has the shape of a truncated pyramid. Furthermore, the lateral panes 44 should preferably be designed as sliding panes or as panes in a folding door to permit the driver to board the cab 45.

With the embodiment illustrated in FIG. 3 which represents a modification over the arrangement of FIGS. 1 and 2, the vehicle frame 46 is designed with substantially straight longitudinal walls 47. Furthermore, according to FIG. 3, the front and rear driving axles 1, 3 are journalled in triangular structures 48 which in their turn are supported in spherical bearings 25 of the traverses 17. The bearings 25 have their axes extending in the longitudinal direction of the vehicle. The central drive of the two take-off shafts 27, 28 is effected by a branch-off transmission 49 which follows the torque converter 19 and which is provided with non-illustrated shiftable couplings for shifting the front or rear take-off shaft in or out. In addition thereto and in contrast to FIG. 2, the rear driving axle 3 forms a steerable driving axle of a portal construction.

It may be mentioned that the torque converter described in connection with FIGS. 1 to 3 and designed as mechanical shiftover transmission may in an advantageous manner also be designed as a hydrostatic torque converter. This has the advantage that with the vehicle by a continuous adaptation of the driving speed an optimum use of the vehicle is possible, namely for working the soil as well as when using the vehicle for transporting and loading operations.

It is, of course, to be understood that the present invention is, by no means, limited to the particular showing in the drawing but also comprises any modifications within the scope of the appended claims.

What is claimed is:

1. In a vehicle, especially for agriculatural purposes; a frame, front and rear driving axles, spring means connecting said axles to said frame, driving wheels of equal size on said axles, a drive engine in the frame between said axles and having the axis thereof extending in the transverse direction of the vehicle, a torque converter adjacent the engine at one end thereof having a primary part drivingly connected to the engine, a power dividing transmission adjacent said torque converter and driven thereby, a drive connection from said transmission to each axle, the common center of gravity of said engine and said primary part being located below said frame substantially midway between said axles, said spring means being rubber springs, said rubber springs forming transverse guiding means for said axles, a longitudinal member connected at one end to each axle and extending therefrom toward the longitudinal center of the frame and pivotally connected at the other end of the frame, support members extending traversely of the frame and therebeneath on opposite sides of the engine, means resiliently connecting the engine to said support members, and bend resistant tie bars connecting said support members to said frame, and spherical bearings connecting said other ends of said longitudinal members to said support members.

2. A vehicle according to claim 1 in which the wheels on at least one axle project longitudinally beyond the adjacent end of said frame.

3. A vehicle according to claim 1 in which each axle includes a differential and the lower extremities of the housings of said differentials and the lower extremities of said engine and torque converter and transmission are substantially in the same horizontal plane.

4. A vehicle according to claim 1 in which each said member is in the form of a pair of legs divergent in one longitudinal direction of the frame.

5. In a vehicle a longitudinally extending frame, front and rear driving axles, spring means supporting and transversely guiding the opposite ends of said frame on said axles, driving wheels of equal size on said axles, a drive engine supported below said frame between said axles and having its axis extending transversely of said frame, a torque converter at one end of said engine and having a primary part drivingly connected to the engine, a power dividing transmission adjacent said torque converter and driven thereby, a drive connection from said transmission to each axle, and mounting means for said engine and torque converter, including supports extending downwardly below said frame having suitable support means for said engine and torque converter connected to their lower ends, the common center of gravity of said engine and said primary part being located below said frame substantially midway between said axles, each axle being connected to said mounting means by a longitudinal member, each longitudinal member being connected to said mounting means by a spherical bearing.

6. In a vehicle as claimed in claim 5, in which said longitudinal frame comprises side rails extending above the front wheels and between the rear wheels.

7. A vehicle according to claim 5 which includes an operators's compartment on said frame between one of said axles and said engine, and control means for the vehicle in said compartment.

* * * * *